(12) United States Patent
Tan et al.

(10) Patent No.: US 9,671,673 B2
(45) Date of Patent: Jun. 6, 2017

(54) OPTICAL DEVICE FOR DISPERSION COMPENSATION

(71) Applicant: Singapore University of Technology and Design, Singapore (SG)

(72) Inventors: Dawn Tan, Singapore (SG); George F. R. Chen, Singapore (SG); Ting Wang, Singapore (SG); Christine Donnelly, Menlo Park, CA (US)

(73) Assignee: SINGAPORE UNIVERSITY OF TECHNOLOGY AND DESIGN, Singapore (SG)

( * ) Notice: Subject to any disclaimer, the term of this patent is extended or adjusted under 35 U.S.C. 154(b) by 99 days.

(21) Appl. No.: 14/542,782

(22) Filed: Nov. 17, 2014

(65) Prior Publication Data

US 2016/0139489 A1 May 19, 2016

(51) Int. Cl.
| | |
|---|---|
| *G02F 1/365* | (2006.01) |
| *G02B 6/12* | (2006.01) |
| *G02B 6/124* | (2006.01) |
| *G02B 6/122* | (2006.01) |
| *G02F 1/35* | (2006.01) |
| *G02F 1/025* | (2006.01) |

(52) U.S. Cl.
CPC ............ *G02F 1/365* (2013.01); *G02B 6/124* (2013.01); *G02B 6/1228* (2013.01); *G02F 1/025* (2013.01); *G02F 1/353* (2013.01); *G02F 2001/354* (2013.01); *G02F 2201/066* (2013.01); *G02F 2201/305* (2013.01); *G02F 2202/105* (2013.01)

(58) Field of Classification Search
CPC .......... G02F 1/365; G02F 1/353; G02F 1/025; G02F 2202/105; G02B 6/124; G02B 6/1228; G02B 2201/066; G02B 2201/354; G02B 2201/305
USPC .............................. 385/129–135, 14, 24–47
See application file for complete search history.

(56) References Cited

U.S. PATENT DOCUMENTS

| | | | | |
|---|---|---|---|---|
| 5,159,474 A | * | 10/1992 | Franke | G01B 11/24 250/208.6 |
| 5,208,884 A | * | 5/1993 | Groh | B29C 45/14467 385/44 |
| 5,982,963 A | * | 11/1999 | Feng | G02B 6/02085 359/290 |
| 6,690,873 B2 | * | 2/2004 | Bendett | C03C 4/00 372/102 |

(Continued)

OTHER PUBLICATIONS

G.G.R. Chen et al., Second and third order dispersion generation using nonlinearly chirped silicon waveguide gratings, Optics Express 21, vol. 21, No. 24, Dec. 2013, pp. 29223-29230.

(Continued)

*Primary Examiner* — Akm Enayet Ullah
(74) *Attorney, Agent, or Firm* — Viering, Jentschura & Partner mbB

(57) ABSTRACT

According to embodiments of the present invention, an optical device is provided. The optical device includes a channel waveguide, and a plurality of optical elements arranged along at least a portion of the channel waveguide to interact with light propagating in the channel waveguide, wherein a period of the plurality of optical elements changes nonlinearly along the portion of the channel waveguide. According to further embodiments of the present invention, a method for forming an optical device is also provided.

4 Claims, 8 Drawing Sheets

(56) References Cited

U.S. PATENT DOCUMENTS

| | | | | |
|---|---|---|---|---|
| 6,787,868 B1* | 9/2004 | McGreer | ............ | G02B 6/12004 257/425 |
| 7,134,752 B2* | 11/2006 | Perrott | ..................... | G02C 7/02 351/159.01 |
| 7,230,692 B2* | 6/2007 | Fukagawa | ........... | G03F 7/70258 356/124 |
| 8,102,503 B2* | 1/2012 | Yoshihara | ........... | G03F 7/70258 355/52 |
| 2001/0021294 A1* | 9/2001 | Cai | .................... | G02B 6/02085 385/37 |
| 2001/0035996 A1* | 11/2001 | Havstad | ............. | H04B 10/2519 398/147 |
| 2002/0094165 A1* | 7/2002 | Rothenberg | ....... | H04B 10/2519 385/37 |
| 2003/0086647 A1* | 5/2003 | Willner | .............. | G02B 6/02085 385/37 |
| 2003/0118073 A1* | 6/2003 | Rockwell | ................ | H01S 3/063 372/70 |
| 2006/0051016 A1* | 3/2006 | Ogawa | ................... | B82Y 20/00 385/27 |
| 2008/0021948 A1* | 1/2008 | Wilson | ...................... | G06E 3/00 708/816 |

OTHER PUBLICATIONS

J.-C. Diels et al., Ultrashort laser pulse phenomena, Academic, 2006, pp. 1-21.
J.F. McMillan et al., Observation of four-wave mixing in slow-light silicon photonic crystal waveguides, Optics Express, vol. 18, No. 15, Jul. 2010, pp. 15484-15497.
J. B. Driscoll et al., Width-modulation of Si photonic wires for quasi-phase-matching of four-wave-mixing: experimental and theoretical demontration, Optic Express, vol. 20, No. 8, Apr. 2012, pp. 9227-9242.
D. T. H. Tan et al., Monolithic nonlinear pulse compressor on a silicon chip, Nature Communications| 1:116 | DOI: 10.1038/ncomms1113 | www.nature.com/naturecommunications, 2010, pp. 1-6.
D. T. H. Tan, Optical pulse compression on a silicon chip-Effect of group velocity dispersion and free carriers, Applied physics letters 101, 2012, pp. 1-2 (211112-1).
L. Zhang et al., On-chip octave-spanning supercontinuum in nanostructured silicon waveguides using ultralow pulse energy, IEEE Journal of selected Topics in Quantum Electronics, vol. 18, No. 6, Nov./Dec. 2012, pp. 1799-1806.
D. T. H. Tan et al., Wide bandwidth, low loss 1 by 4 wavelength division multiplexer on silicon for optical interconnects, Optics Express, vol. 19, No. 3, Jan. 2011, pp. 2401-2409.
M. Nakazawa et al., 1.28 Tbit/s-70 km OTDM transmission using third- and fourth-order simultaneous dispersion compensation with a phase modulator, Electronics letters, vol. 36, No. 24, Nov. 2000, pp. 2027-2029.
G. P. Agrawal, Nonlinear Fiber Optics, 3rd edition, Academic, 1995, pp. 1-467.
M. Miyagi et al., Pulse spreading in a single-mode fiber due to third-order dispersion, Applied Optics, vol. 18, No. 5, Mar. 1979, pp. 678-682.
K. O. Hill et al., Chirped in-fiber bragg gratings for compensation of optical-fiber dispersion, Optics Letters, vol. 19, No. 17, Sep. 1994, pp. 1314-1316.
F. Ouellette et al., Broadband and WDM dispersion compensation using chirped sampled fibre bragg gratings, Electronics letters, vol. 31, No. 11, May 1995, pp. 899-901.
S. Matsumoto et al., Tunable dispersion slope compensator with a chirped fiber granting and a divided thin-film heater for 160-Gb/s RZ Transmissions, IEEE Photonics Technology Letters, vol. 16, No. 4, Apr. 2014, pp. 1095-1097.
P. I. Reyes et al., 160-Gb/s tunable dispersion slope compensator using a chirped fiber bragg grating and a quadratic heater, IEEE Photonics Technology Letters, vol. 17, No. 4, Apr. 2005, pp. 831-833.
M. Ibsen et al., Fiber Bragg gratings for pure dispersion-slope compensation, Optics Letters, vol. 28, No. 12, Jun. 2003, pp. 980-982.
M. Durkin et al., 1 m long continuously-written fibre bragg gratings for combined second- and third-order dispersion compensation, Electronics Letters, vol. 33, No. 22, Oct. 1997, pp. 1891-1893.
E. Dulkeith et al., Group index and group velocity dispersion in silicon-on-insulator photonic wires, Optics Express, vol. 14, No. 9, May 2006, pp. 3853-3863.
A. C. Turner et al., Tailored anomalous group-velocity dispersion in silicon channel waveguides, Optics Express, vol. 14, No. 10, May 2006, pp. 4357-4362.
I. - W Hsieh et al., Ultrafast-pulse self-phase modulation and third-order dispersion in Si photonic wire-waveguides, Optics Express, vol. 14, No. 25, Dec. 2006, pp. 12380-12387.
L. Yin et al., Dispersion tailoring and soliton propagation in silicon waveguides, Optics Letters, vol. 31, No. 9, May 2006, pp. 1295-1297.
M. D. Marko et al., Phase-resolved observations of optical pulse propagation in chip-scale silicon nanowires, Applied Physics Letters 103, 2013, pp. 021103-01-021103-5.
H. - C. Kim et al., Resonant waveguide device with vertical gratings, Optics Express, vol. 32, No. 5, Mar. 2007, pp. 539-541.
S. Zamek et al., Compact chip-scale filter based on curved waveguide bragg gratings, Optics Letters, vol. 35, No. 20, Oct. 2010, pp. 3477-3479.
A. Grieco et al., Optical bistability in a silicon waveguide distributed bragg reflector Fabry-Perot resonator, IEEE Journal of Lightwave Technology, vol. 30, No. 14, Jul. 2012, pp. 2352-2355.
X. Wang et al., Narrow-band waveguide bragg gratings on SOI wafers with CMOS-compatible fabrication process, Optics Letters, vol. 20, No. 14, Jul. 2012, pp. 15547-15558.
J. S. Foresi et al., Photonic-bandgap microcavities in optical waveguides, Nature, vol. 390, Nov. 1997, pp. 143-145.
D. T. H. Tan et al., Cladding-modulated bragg gratings in silicon waveguides, Optics Letters, vol. 34, No. 9, May 2009, pp. 1357-1359.
R. Kashyap, Fiber bragg gratings, Academic, 1999, pp. 1-478.
M. Notomi et al., Extremely large group-velocity dispersion of line-defect waveguides in photonic crystal slabs, Physical Review Letters, vol. 87, No. 25, Dec. 2001, pp. 253902-1-253902-4.
L. Zhang et al., Analysis and engineering of chromatic dispersion in silicon waveguide bends and ring resonators, Optics Express, vol. 19, No. 9, pp. 8102-8107.
D. T. H. Tan et al., Chip-scale dispersion engineering using chirped vertical gratings, Optics Letters, vol. 33, No. 24, Dec. 2008, pp. 3013-3015.
D. T. H. Tan et al., Coupled chirped vertical gratings for on-chip group velocity dispersion engineering, Applied Physics Letters 95, 2009, pp. 141109-1-141109-3.

* cited by examiner

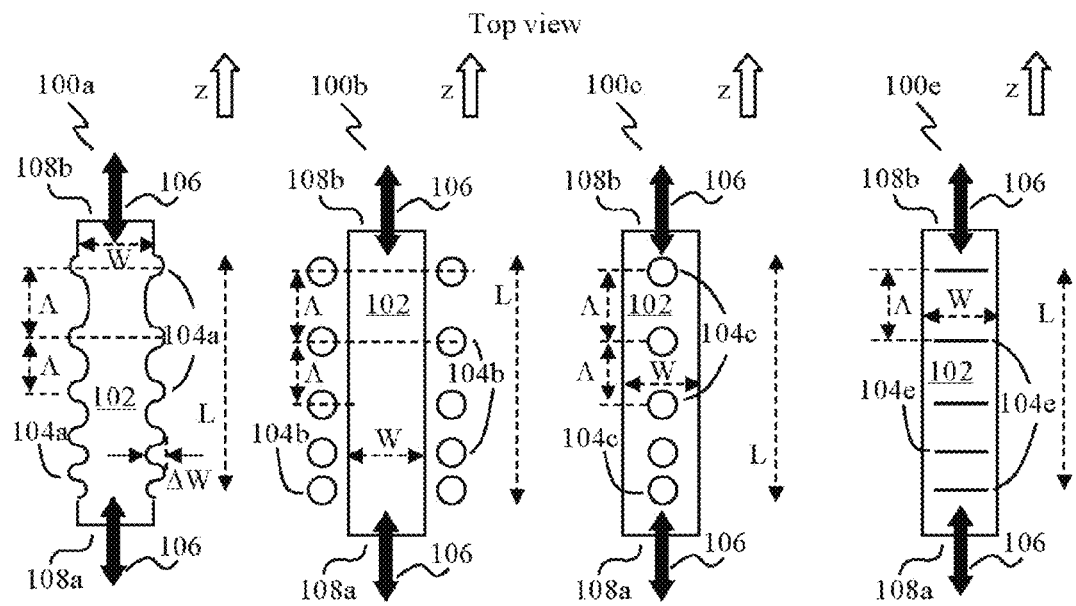
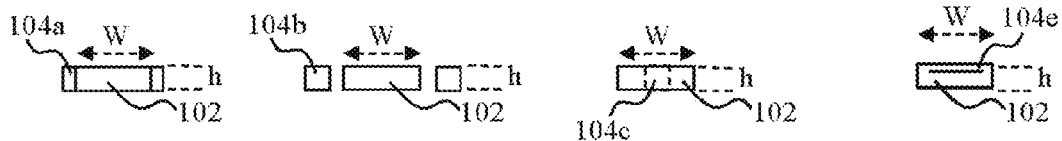
FIG. 1A  FIG. 1B  FIG. 1C  FIG. 1E
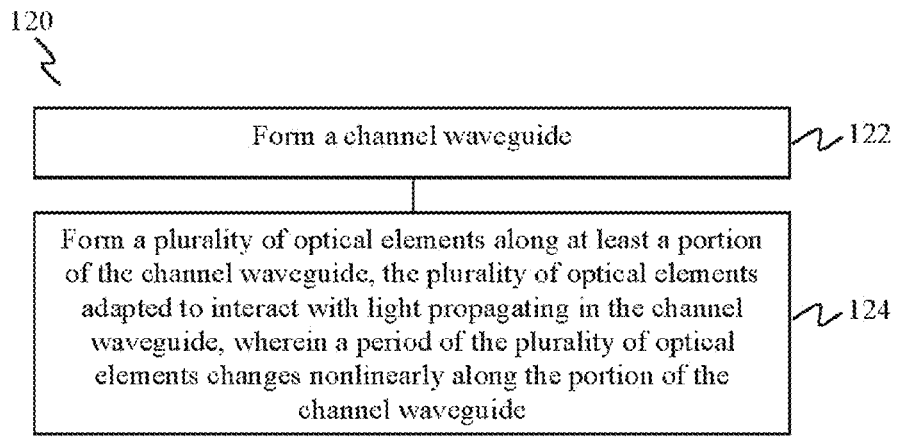
FIG. 1D

OPTICAL DEVICE FOR DISPERSION COMPENSATION

TECHNICAL FIELD

Various embodiments relate to an optical device and a method for forming an optical device.

BACKGROUND

The propagation of short pulses relies on managing the group velocity dispersion in the propagation medium. For most applications, the management of second order dispersion is of primary concern. Dispersion results in unwanted pulse broadening, but can also be harnessed for interesting nonlinear effects such as four-wave mixing, optical pulse compression, and supercontinuum generation. The trend towards faster optical information processing entails the use of wavelength division multiplexing (WDM) and optical time division multiplexing (OTDM). For successful OTDM, optical pulses are expected to become narrower to accommodate higher data rates and hence more susceptible to both second and higher order dispersion.

The dispersion length and the third order dispersion (TOD) length are measures of the propagation length beyond which the second and third order dispersion (TOD) respectively in the propagation medium start to become important. The dispersion length is proportional to the square of the pulse width and inversely proportional to the second order dispersion of the medium, while the TOD length is proportional to the cube of the pulse width, and inversely proportional to the TOD of the medium. It follows that optical pulses with shorter temporal widths have a shorter dispersion length and TOD length. The issue of second and third order dispersion and their pulse broadening effects in single mode fibers first arose over three decades ago. To resolve the issue of pulse broadening from dispersion, several compensators have been demonstrated for both second order and third order dispersion, mostly using optical fiber platforms.

Nanophotonics for integration of various information systems on a chip using the CMOS (complementary metal-oxide-semiconductor) compatible Silicon on Insulator (SOI) platform provides the same advantages as CMOS in microelectronics—reduced cost, increased performance, compact components with complex functionalities. Because of the high index contrast of silicon with respect to its cladding and the fact that light is highly confined in the core, the group velocity dispersion of silicon waveguides can exceed three orders of magnitude compared to single mode optical fibers. The proliferation of SOI based nanophotonics, coupled with the need to support high data rates on this platform, implies that both second and third order dispersion will become increasingly important. The TOD of silicon waveguides has been characterized to be up to three orders of magnitude larger than that in single mode optical fibers. In addition, SOI waveguides engineered to have close to zero second order dispersion would experience much more pronounced effects from TOD. This further strengthens the importance of dispersion engineering in photonic wires.

SUMMARY

According to an embodiment, an optical device is provided. The optical device may include a channel waveguide, and a plurality of optical elements arranged along at least a portion of the channel waveguide to interact with light propagating in the channel waveguide, wherein a period of the plurality of optical elements changes nonlinearly along the portion of the channel waveguide.

According to an embodiment, a method for forming an optical device is provided. The method may include forming a channel waveguide, and forming a plurality of optical elements along at least a portion of the channel waveguide, the plurality of optical elements adapted to interact with light propagating in the channel waveguide, wherein a period of the plurality of optical elements changes nonlinearly along the portion of the channel waveguide.

According to an embodiment, an optical device is provided. The optical device may include a channel waveguide, and a nonlinearly chirped grating defined in at least a portion of the channel waveguide.

According to an embodiment, an optical device is provided. The optical device may include a channel waveguide comprising opposite corrugated sidewalls along at least a portion of the channel waveguide, wherein a period of the corrugations of the corrugated sidewalls changes nonlinearly along the portion of the channel waveguide.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIGS. 1A to 1C show respective schematic top and cross sectional views of an optical device, according to various embodiments.

FIG. 1D shows a flow chart illustrating a method for forming an optical device, according to various embodiments.

FIG. 1E shows schematic top and cross sectional views of an optical device, according to various embodiments.

DETAILED DESCRIPTION

Figure 2A:
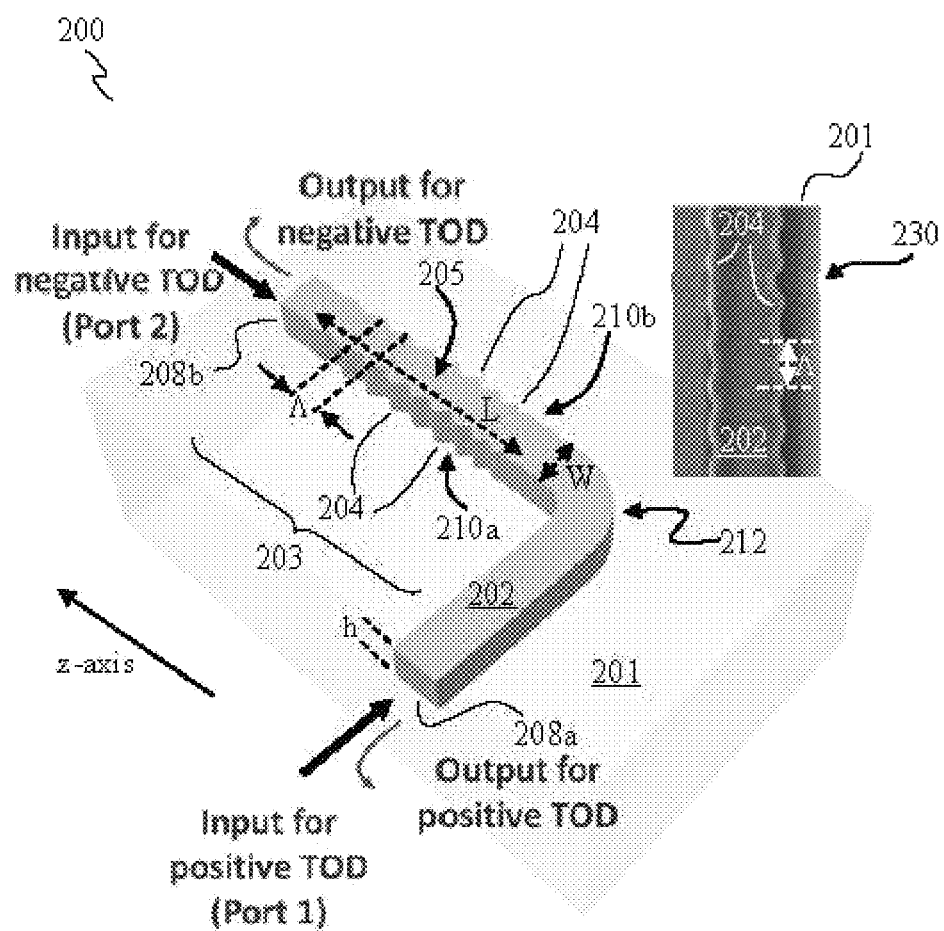
FIG. 2A shows a schematic perspective view of an optical device, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may provide an integrated optical device capable of generating large third order dispersion. The device may be implemented on a silicon-on-insulator (SOI) platform, and may be designed to generate both second and third order dispersion simultaneously, so as to adequately compensate for both types of dispersion. Such dispersive elements may have potential applications in, for example, group velocity dispersion compensation, TOD (third order dispersion) compensation, pulse shaping and nonlinear optical applications.

Various embodiments may provide a device (e.g., an optical device, or an integrated photonic device) generating tailored second and third order optical dispersion. The device may simultaneously generate second and third order dispersion using nonlinearly chirped silicon (Si) waveguide gratings. The nonlinearly chirped gratings may be designed to generate varying signs and magnitudes of the group velocity dispersion and the dispersion slope.

Various embodiments may enable second and third order dispersion generation using nonlinearly chirped silicon (Si) waveguide gratings. Various embodiments may enable the simultaneous generation of second and third order dispersion using nonlinearly chirped silicon waveguide gratings. The nonlinearly chirped gratings may be designed to generate varying signs and magnitudes of group velocity dispersion and dispersion slope. The design, fabrication, and measurement characterization of the silicon waveguide gratings have been performed, as will be described later below. Second order dispersion as high as $-2.3\times10^6$ ps/nm/km and third order dispersion as high as $1.2\times10^5$ ps/nm$^2$/km and as low as $1.2\times10^4$ ps/nm$^2$/km may be obtained at a wavelength of about 1.55 μm.

The design for the optical device of various embodiments will now be described. The dispersion in a propagation medium may be represented by a Taylor series expansion of the propagation constant in a waveguide, as provided below:

$$\beta(\omega) = \beta_0(\omega) + \frac{\partial \beta}{\partial \omega}(\omega - \omega_0) + \frac{1}{2}\frac{\partial^2 \beta}{\partial \omega^2}(\omega - \omega_0)^2 + \frac{1}{6}\frac{\partial^3 \beta}{\partial \omega^3}(\omega - \omega_0)^3 + \dots , \quad \text{(Equation 1)}$$

where ω is the angular frequency, $\beta_n$ is the nth derivative of β(ω) with respect to ω and ω0 is the carrier frequency. The last two terms of Equation 1 represent the group velocity dispersion (GVD) or equivalently, the second order dispersion, and third order dispersion (TOD) respectively.

The TOD may be expressed as $$\beta_3 = \frac{1}{c}\left(\left(2 + \frac{dn_{eff}}{d\omega}\right)\frac{d^2 n_{eff}}{d\omega^2} + \omega\frac{d^3 n_{eff}}{d\omega^3}\right), \quad \text{(Equation 2)}$$

where $\beta_3$ represents the third order dispersion, c is the speed of light, ω is the angular frequency, and $n_{eff}$ is the effective refractive index of the propagation medium.

Further, the group velocity dispersion (GVD) may be re-expressed as a function of wavelength to provide the GVD parameter, D, as below $$D = \frac{2\pi c}{\lambda^2}\beta_2, \quad \text{(Equation 3)}$$

where c is the speed of light, λ is wavelength, and $\beta_2$ represents the second order dispersion. The third order dispersion parameter, S, may be determined as the local dispersion slope of the dispersion vs. wavelength plot.

Single mode fibers are characterized by second and third order dispersion, D=17 ps/nm/km and S=0.072 ps/nm²/km at a wavelength of 1.55 µm. Prior work in fiber Bragg gratings utilized gratings which were chirped in a square root function with respect to the z-location. This was to ensure that the generated second order dispersion was normal and the dispersion slope was negative, so as to compensate for the inherent anomalous dispersion and positive dispersion slope in single mode fibers at 1.55 µm.

The dispersion and dispersion slope in silicon waveguides however, can vary significantly as their geometries change. For example, silicon waveguides which are about 430 nm by about 1.3 µm have normal dispersion with a positive dispersion slope at a wavelength of about 1.55 µm. Therefore, a dispersive element which is characterized by anomalous dispersion (e.g., an element whose refractive index increases with increasing wavelength) and a negative dispersion slope may be suitable or ideal for compensating for both the second and third order dispersion in such a waveguide. Conversely, a silicon waveguide which is about 300 nm by about 300 nm may possess anomalous dispersion and a negative dispersion slope at a wavelength of about 1.5 µm, and in this case, dispersive elements possessing normal dispersion (e.g., an element whose refractive index decreases with increasing wavelength) and a positive dispersion slope would be suitable or ideal for compensating for both the second and third order dispersion.

In various embodiments, dispersive elements capable of compensating for both the second and third order dispersion of the aforementioned devices using a silicon-on-insulator (SOI) device may be designed, as will be described later below.

Various embodiments of the optical devices will now be described by way of the following non-limiting examples.

FIGS. 1A to 1C show respective schematic top and cross sectional views of an optical device 100a, 100b, 100c, according to various embodiments. The optical device 100a, 100b, 100c may include a channel waveguide 102, a plurality of optical elements 104a, 104b, 104c arranged along at least a portion of the channel waveguide 102 to interact with light 106 propagating in the channel waveguide 102, wherein a period, Λ, of the plurality of optical elements 104a, 104b, 104 changes nonlinearly along the portion of the channel waveguide 102.

In the context of various embodiments, a "channel waveguide" may refer to a waveguide that may confine one or more optical modes in at least two dimensions, e.g., in the transverse directions (x- and y-directions) such that the mode is guided and propagates, e.g., along the z-direction (direction of propagation of the light 106). Propagation of the optical mode may be allowed along one dimension only, for example, along the z-direction. This confinement of the optical mode in the transverse directions in a channel waveguide may be achieved via incorporating a cladding material around the channel waveguide or the waveguide core in all transverse directions. In various embodiments, a channel waveguide may include at least one planar surface. In this way, for example, the channel waveguide may be or may include a planar waveguide, where the planar waveguide may confine one or more optical modes in at least two dimensions, e.g., in the transverse directions (x- and y-directions). As a non-limiting example, a channel waveguide may include a planar surface defined along the width direction (e.g., y-direction) and/or the height direction (e.g., x-direction) of the channel waveguide. In various embodiments, a channel waveguide may include planar surfaces aligned along the transverse directions (x- and y-directions).

In other words, an optical device 100a, 100b, 100c of various embodiments may include a channel waveguide 102. The channel waveguide 102 may receive light, as represented by the arrows 106. The channel waveguide 102 may include two ends 108a, 108b where light 106 may be launched or provided into the channel waveguide 106 via either or both of the two ends 108a, 108b. Light 106 launched through the end 108a may be output, with a changed TOD (e.g., positive TOD), through the end 108a. Light 106 launched through the end 108b may be output, with a changed TOD (e.g., negative TOD), through the end 108b. The light 106 provided into the channel waveguide 102 may propagate in the channel waveguide 102. The optical device 100a, 100b, 100c may further include a plurality of optical elements 104a, 104b, 104c to interact with the light 106 propagating in the channel waveguide 102. The plurality of optical elements 104a, 104b, 104c may be arranged along at least a portion of the channel waveguide 102, for example along a length direction (or longitudinal axis) of the channel waveguide 102. The plurality of optical elements 104a, 104b, 104c may be arranged relative to the portion of the channel waveguide 102 such that the plurality of optical elements 104a, 104b, 104c may interact with the light 106 propagating in the channel waveguide 102. The plurality of optical elements 104a, 104b, 104c may interact with the optical mode of the light 106 and/or the evanescent wave (or evanescent mode) of the light 106. The plurality of optical elements 104a, 104b, 104c may be arranged such that a period (or a pitch), Λ, of the plurality of optical elements 104a, 104b, 104c may change nonlinearly along the portion of the channel waveguide 102. In other words, the plurality of optical elements 104a, 104b, 104c may have a nonlinearly chirped period, Λ(z), where z is the longitudinal coordinate of the waveguide 102 in the direction of propagation of the light 106.

In various embodiments, interaction between the light 106 propagating in the channel waveguide 102 and the plurality of optical elements 104a, 104b, 104c may cause reflection of the light 106 by the plurality of optical elements 104a, 104b, 104c.

In various embodiments, the period, Λ, of the plurality of optical elements 104a, 104b, 104c may increase or decrease nonlinearly along the portion of the channel waveguide 102. Depending on the direction of launch of light 106 into the channel waveguide 102 or the direction of propagation of light 106 in the channel waveguide 102, the light 106 may encounter a plurality of optical elements 104a, 104b, 104c with a nonlinearly increasing period, Λ, or a nonlinearly decreasing period, Λ(z), where z is the longitudinal coordinate of the waveguide 102 in the direction of propagation of the light 106.

As non-limiting examples, light 106 propagating from a first end 108a of the channel waveguide 102 through the plurality of optical elements 104a, 104b, 104c towards a second end 108b of the channel waveguide 102 may encounter the plurality of optical elements 104a, 104b, 104c with a period, Λ, that increases nonlinearly. Conversely, light 106 propagating from the second end 108b of the channel waveguide 102 through the plurality of optical elements 104a, 104b, 104c towards the first end 108a of the channel waveguide 102 may encounter the plurality of optical elements 104a, 104b, 104c with a period, Λ, that decreases nonlinearly.

In various embodiments, the plurality of optical elements 104a, 104b, 104c may impose at least one dispersive property or effect onto at least one inherent dispersive property of the channel waveguide 102. The plurality of optical elements 104a, 104b, 104c may act to compensate for at least one inherent dispersive property of the channel waveguide 102. In this way, the plurality of optical elements 104a, 104b, 104c and the channel waveguide 102 may cooperate to define at least one effective dispersive property for the channel waveguide 102.

For example, the plurality of optical elements 104a, 104b, 104c may generate at least one dispersive property or effect for compensating the corresponding inherent dispersive property of the channel waveguide 102. The at least one dispersive property may include a second order dispersion (e.g., group velocity dispersion (GVD), also known as "dispersion") and/or a third order dispersion (also known as "dispersion slope"). In this way, the plurality of optical elements 104a, 104b, 104c may act to change at least one dispersive property of the channel waveguide 102, by compensating the at least one inherent dispersive property of the channel waveguide 102 so as to define at least one effective dispersive property that may be encountered or experienced by light 106 propagating in the channel waveguide 102. As a result, the plurality of optical elements 104a, 104b, 104c may be capable of providing at least one dispersive property or effect (e.g. second order and/or third order dispersion) to be experienced or encountered by the light 106 propagating in the channel waveguide 102 and interacting with the plurality of optical elements 104a, 104b, 104c.

In various embodiments, by providing a period, $\Lambda$, of the plurality of optical elements 104a, 104b, 104c that may change nonlinearly, the plurality of optical elements 104a, 104b, 104c may be capable of generating second order and/or third order dispersion. In various embodiments, the plurality of optical elements 104a, 104b, 104c may be capable of generating second order dispersion and third order dispersion simultaneously. This may mean that the plurality of optical elements 104a, 104b, 104c may act to compensate for the inherent second order dispersion and third order dispersion of the channel waveguide 102 simultaneously.

In various embodiments, the plurality of optical elements 104a, 104b, 104c may generate different or varying signs (e.g., positive or negative) and/or different or varying magnitudes of each of the second order dispersion and the third order dispersion. For example, the plurality of optical elements 104a, 104b, 104c may generate or be characterized by normal dispersion or anomalous dispersion, as well as positive dispersion slope or negative dispersion slope. This may be helpful in compensating for the inherent dispersive properties of the channel waveguide 102.

In various embodiments, depending on the direction of launch of light 106 into the channel waveguide 102 or the direction of propagation of light 106 in the channel waveguide 102 such that the light 106 may encounter a plurality of optical elements 104a, 104b, 104c with a nonlinearly increasing period, $\Lambda$, or a nonlinearly decreasing period, $\Lambda$, the light 106 propagating in the channel waveguide 102 may experience or encounter dispersion of opposite signs and/or dispersion slopes of opposite signs. Further, in various embodiments, for the same direction of launch or propagation, the dispersion and the dispersion slope may be of opposite signs.

In the context of various embodiments, the period, $\Lambda$, of the plurality of optical elements 104a, 104b, 104c may change as a quadratic function of a distance (or location) along the portion of the channel waveguide 102 relative to an origin (e.g., a starting position or point) of the portion of the channel waveguide 102. The origin of the portion of the channel waveguide 102 may correspond to the origin or starting position of the (arrangement of) plurality of optical elements 104a, 104b, 104c. In other words, the distance may also refer to that between the origin of the plurality of optical elements 104a, 104b, 104c and a location within the (arrangement of) plurality of optical elements 104a, 104b, 104c.

In various embodiments, the plurality of optical elements 104a, 104b may be arranged on opposite sides of the channel waveguide 102. This may mean that the channel waveguide 102 may be sandwiched by the plurality of optical elements 104a, 104b arranged on opposite sides of the channel waveguide 102. For example, a first set of optical elements of the plurality of optical elements 104a, 104b may be arranged on a first side of the channel waveguide 102, and a second set of optical elements of the plurality of optical elements 104a, 104b may be arranged on a second side of the channel waveguide 102, where the first and second sides are opposite sides.

In various embodiments, the period, $\Lambda$, of the plurality of optical elements 104a, 104b arranged on one side (e.g. a first side) of the channel waveguide 102 may change in sync with the period, $\Lambda$, of the plurality of optical elements 104a, 104b arranged on the opposite side (e.g. a second side) of the channel waveguide 102. This may mean that the periods, $\Lambda$, of the plurality of optical elements 104a, 104b arranged on opposite sides (e.g. first and second sides) of the channel waveguide 102 may be at least substantially the same or identical. In various embodiments, corresponding respective optical elements 104a, 104b arranged on opposite sides of the channel waveguide 102 may be arranged coaxially along an axis that is at least substantially perpendicular to a longitudinal axis of the channel waveguide 102.

In various embodiments, the plurality of optical elements 104a may include corrugations defined or formed on opposite sidewalls of the channel waveguide 102. In other words, the channel waveguide 102 may have modulated sidewalls. In various embodiments, the plurality of optical elements 104a, in the form of corrugations defined on opposite sidewalls of the channel waveguide 102, may function as a grating. The period, $\Lambda$, of the corrugations 104a defined on one side (e.g. a first side) of the channel waveguide 102 may change in sync with the period, $\Lambda$, of the corrugations 104a defined on the opposite side (e.g. a second side) of the channel waveguide 102. This may mean that the periods, $\Lambda$, of the corrugations 104a defined on opposite sides (e.g. first and second sides) of the channel waveguide 102 may be at least substantially the same or identical. In various embodiments, corresponding portions of the corrugations 104a defined on opposite sides of the channel waveguide 102 may be arranged coaxially along an axis that is at least substantially perpendicular to a longitudinal axis of the channel waveguide 102. For example, corresponding peaks (or troughs) of the corrugations 104a defined on opposite sides of the channel waveguide 102 may be arranged coaxially along an axis that is at least substantially perpendicular to a longitudinal axis of the channel waveguide 102.

In various embodiments, the corrugations 104a may have a sinusoidal profile. In other words, the channel waveguide 102 may include sinusoidally modulated sidewalls. This may mean that the optical device 100a of various embodiments may include a sinusoidally corrugated waveguide grating. It should be appreciated that other sidewall modulation types which provide an effective index modulation such as rectangular corrugations (e.g., rectangular profile), cladding modulation etc. may also be used.

In various embodiments, a depth (or modulation amplitude), $\Delta W$, of the corrugations 104a may be in a range of between about 30 nm and about 100 nm, for example, between about 30 nm and about 50 nm, between about 50 nm and about 100 nm, or between about 50 nm and about 70 nm, e.g., about 30 nm, about 50 nm or about 100 nm. It should be appreciated that the dimension of the depth, $\Delta W$, of the corrugations 104a may be varied based on the type of waveguide platform used. As a non-limiting example, based on a silicon-on-insulator (SOI) substrate or platform, the depth, $\Delta W$, of the corrugations 104a may be about 50 nm. The term "depth" may refer to the distance or spacing between the maximum plane and the minimum plane of the corrugations 104a. In various embodiments, the maximum plane may correspond to the peaks of the corrugations 104a, and/or the minimum plane may correspond to the troughs of the corrugations 104a. In various embodiments, the depth of the corrugations 104a may change along the portion of the channel waveguide 102.

In various embodiments, the plurality of optical elements 104b may be arranged spaced apart from opposite sidewalls of the channel waveguide 102. In various embodiments, the plurality of optical elements 104b may include cylindrical elements. The cylindrical elements 104b may be arranged spaced apart from opposite sidewalls of the channel waveguide 102. As a non-limiting example, a first set of the cylindrical elements 104b may be arranged on a first side of the channel waveguide 102, spaced apart from a first sidewall of the channel waveguide 102, and a second set of the cylindrical elements 104b may be arranged on a second side of the channel waveguide 102, spaced apart from a second sidewall of the channel waveguide 102, where the first and second sides are opposite sides.

In various embodiments, the plurality of optical elements 104c may include a plurality of openings (e.g. holes) defined at least partially through the channel waveguide 102. The plurality of openings 104c may be defined through the entire height, h, or thickness of the channel waveguide 102.

In the context of various embodiments, the plurality of optical elements 104a, 104b, 104c may define a nonlinearly chirped grating. The nonlinearly chirped grating may be apodised.

In various embodiments, the optical device 100a, 100b, 100c may further include an additional channel waveguide arranged adjacent to the channel waveguide 102 for coupling light (e.g., counterpropagating light) between the channel waveguide 102 and the additional channel waveguide, and a plurality of additional optical elements arranged along at least a portion of the additional channel waveguide to interact with light propagating in the additional channel waveguide, wherein a period, $\Lambda$, of the plurality of additional optical elements changes nonlinearly along the portion of the additional channel waveguide. Accordingly, an optical device having coupled channel waveguides or coupled channel gratings may be provided. In this way, for example, the light 106 propagating in the channel waveguide 102 may be optically coupled to the additional channel waveguide and subsequently propagate through the additional channel waveguide, and vice versa.

In various embodiments, the channel waveguide 102 and the additional channel waveguide may be arranged side-by-side, for example, in a width direction of the channel waveguide 102 and/or a width direction of the additional channel waveguide. The channel waveguide 102 and the additional channel waveguide may be arranged spaced apart from each other but in (close) proximity to each other, for example, in a width direction of the channel waveguide 102 and/or a width direction of the additional channel waveguide. The channel waveguide 102 and the additional channel waveguide may be arranged at least substantially parallel to each other. In various embodiments, the portion of the channel waveguide 102 (where the plurality of optical elements 104a, 104b, 104c may be arranged) and the portion of the additional channel waveguide (where the plurality of additional optical elements may be arranged) may overlap with each other, for example, in a width direction of the channel waveguide 102 and/or a width direction of the additional channel waveguide. For example, this may mean that the portion of the channel waveguide 102 (where the plurality of optical elements 104a, 104b, 104c may be arranged) and the portion of the additional channel waveguide (where the plurality of additional optical elements may be arranged) may be arranged coaxially in a width direction of the channel waveguide 102 and/or a width direction of the additional channel waveguide.

The plurality of additional optical elements may define a nonlinearly chirped grating. It should be appreciated that the plurality of additional optical elements associated with the additional channel waveguide may be the same as the plurality of optical elements associated with the channel waveguide 102. The plurality of additional optical elements associated with the additional channel waveguide may include any one of the plurality of optical elements 104a (corrugations defined or formed on opposite sidewalls of the additional channel waveguide), the plurality of optical elements 104b (cylindrical elements), or the plurality of optical elements 104c (plurality of openings (e.g. holes)).

The period, $\Lambda$, or the nonlinear change of the period, $\Lambda$, of the plurality of additional optical elements, may be the same as that for the plurality of optical elements 104a, 104b, 104c. The channel waveguide 102 and the additional channel waveguide may have different widths, W. The channel waveguide 102 and the additional channel waveguide may have different corrugation depth, $\Delta W$.

It should be appreciated that descriptions in the context of the channel waveguide 102 may similarly be applicable to the additional channel waveguide. Further, it should be appreciated that descriptions in the context of the plurality of optical elements 104a, 104b, 104c, may similarly be applicable to the plurality of additional optical elements.

In various embodiments, the optical device 100a, 100b, 100c may further include an overclad arranged or formed over the channel waveguide 102 and the plurality of optical elements 104a, 104b, 104c. The overclad may also be formed over the additional channel waveguide and the plurality of additional optical elements. The overclad may include but not limited to poly(methyl methacrylate) (PMMA). It should be appreciated that other materials may be used, including other dielectric and polymeric materials. The overclad may have a refractive index that is lower than the refractive index of the channel waveguide 102.

In various embodiments, the channel waveguide 102 may include a structure used to facilitate coupling into and out of the waveguide 102, for example, a grating coupler or an inverse tapering region at an end region (e.g., a region near the end 108a and/or 108b), of the channel waveguide 102. This may mean that a dimension (e.g., height and/or width) of the channel waveguide 102 may decrease in a direction from the portion of the channel waveguide 102 towards (or to) the end region of the channel waveguide 102. In various embodiments, respective grating couplers or inverse tapering regions may be provided or formed at respective end regions of the channel waveguide 102. The above description may similarly be applicable to the additional channel waveguide.

In the context of various embodiments, the optical device 100a, 100b, 100c may further include a carrier, where the channel waveguide 102 may be formed or arranged on the carrier. The additional channel waveguide may also be formed or arranged on the carrier. The carrier may include at least one of a dielectric substrate or a semiconductor substrate. In various embodiments, the carrier may include a silicon-on-insulator (SOI) substrate. This may mean that the optical device may be formed on a silicon-on-insulator (SOI) platform. It should be appreciated that other substrates may also be used such as a silicon (Si) substrate, a silicon dioxide (SiOx) substrate, or an aluminum gallium arsenide (AlGaAs) substrate, among others. This may mean that other material platforms may also be used such as silicon nitride on silicon dioxide, or gallium arsenide on aluminum gallium arsenide, among others.

In the context of various embodiments, the channel waveguide 102 and/or the additional channel waveguide may have a height, h, in a range of between about 150 nm and about 350 nm, for example, between about 150 nm and about 250 nm, between about 250 nm and about 350 nm, or between about 200 nm and about 300 nm, e.g., about 200 nm, about 250 nm, or about 300 nm. It should be appreciated that the dimension of the height, h, of the channel waveguide 102 and/or the additional channel may be varied based on the waveguide design and/or platform. As a non-limiting example, based on a silicon-on-insulator (SOI) substrate or platform, the height, h, of the channel waveguide 102 may be about 250 nm.

In the context of various embodiments, the channel waveguide 102 and/or the additional channel waveguide may have a width, W, in a range of between about 200 nm and about 500 nm, for example, between about 200 nm and about 400 nm, between about 200 nm and about 300 nm, between about 300 nm and about 500 nm, between about 200 nm and about 250 nm, between about 250 nm and about 300 nm, or between about 230 nm and about 280 nm, e.g., about 200 nm, about 250 nm, or about 300 nm. It should be appreciated that the dimension of the width, W, of the channel waveguide 102 and/or the additional channel waveguide may be varied based on the waveguide design and/or platform. As a non-limiting example, based on a silicon-on-insulator (SOI) substrate or platform, the width, W, of the channel waveguide 102 may be about 500 nm. Nevertheless, it should be appreciated that a width, W, of more than 500 nm may also be provided.

In the context of various embodiments, the portion of the channel waveguide 102 (where the plurality of optical elements 104a, 104b, 104c may be arranged) and/or the portion of the additional channel waveguide (where the plurality of additional optical elements may be arranged) may have a length, L, of about 500 µm or more (e.g. ≥500 µm), for example, ≥600 µm, ≥700 µm, ≥800 µm, ≥1000 µm or ≥5 mm. Nevertheless, it should be appreciated that the plurality of optical elements 104a, 104b, 104c may be arranged along the entire length of the channel waveguide 102. Similarly, the plurality of additional optical elements may be arranged along the entire length of the additional channel waveguide. In the context of various embodiments, the length, L, may also define the grating length.

In the context of various embodiments, the channel waveguide 102 and/or the additional channel waveguide may have a cross-sectional shape in the form of a square or a rectangle.

In the context of various embodiments, the channel waveguide 102 and/or the additional channel waveguide may be or may include at least one of a strip waveguide, a rib waveguide or a ridge waveguide.

In the context of various embodiments, the channel waveguide 102 and/or the additional channel waveguide may include at least one of a dielectric material or a semiconductor material. As a non-limiting example, the channel waveguide 102 and/or the additional channel waveguide may include silicon (Si). Accordingly, the optical device 100a, 100b, 100c of various embodiments may include a silicon (Si) channel waveguide. It should be appreciated that other materials may also be used for the channel waveguide 102 and/or the additional channel waveguide, such as silicon nitride (SiNx) or gallium arsenide (GaAs), among others. This may mean that the optical device 100a, 100b, 100c may have material platforms such as silicon on SOI, silicon nitride on silicon dioxide, or gallium arsenide on aluminum gallium arsenide, among others.

FIG. 1D shows a flow chart 120 illustrating a method for forming an optical device, according to various embodiments.

At 122, a channel waveguide is formed.

At 124, a plurality of optical elements are formed along at least a portion of the channel waveguide, the plurality of optical elements adapted to interact with light propagating in the channel waveguide, wherein a period, Λ, of the plurality of optical elements changes nonlinearly along the portion of the channel waveguide.

In various embodiments, the period, Λ, of the plurality of optical elements may change as a quadratic function of a distance along the portion of the channel waveguide relative to an origin of the portion of the channel waveguide.

In various embodiments, the plurality of optical elements may be arranged on opposite sides of the channel waveguide.

In various embodiments of forming the plurality of optical elements, at 124, corrugations may be defined or formed on opposite sidewalls of the channel waveguide. The corrugations may have a sinusoidal profile. In various embodiments, the period, Λ, of the corrugations formed on one sidewall of the channel waveguide may be at least substantially similar or identical to the period, Λ, of the corrugations formed on the opposite sidewall of the channel waveguide.

In various embodiments, a depth, ΔW, of the corrugations may be in a range of between about 30 nm and about 100 nm, for example, between about 30 nm and about 50 nm, between about 50 nm and about 100 nm, or between about 50 nm and about 70 nm, e.g., about 30 nm, about 50 nm or about 100 nm. It should be appreciated that the dimension of the depth, ΔW, of the corrugations may be varied based on the type of waveguide platform used. As a non-limiting example, based on a silicon-on-insulator (SOI) substrate or platform, the depth, ΔW, of the corrugations may be about 50 nm. The depth, ΔW, of the corrugations may change along the portion of the channel waveguide.

In various embodiments, the plurality of optical elements may be arranged spaced apart from opposite sidewalls of the channel waveguide. In various embodiments, the plurality of optical elements may include cylindrical elements.

In various embodiments of forming the plurality of optical elements, at 124, a plurality of openings may be defined or formed at least partially through the channel waveguide.

In various embodiments, the plurality of optical elements may define a nonlinearly chirped grating. The nonlinearly chirped grating may be apodised.

In various embodiments, the method may further include forming an additional channel waveguide adjacent to the channel waveguide for coupling light (e.g., counterpropagating light) between the channel waveguide and the additional channel waveguide, and forming a plurality of additional optical elements along at least a portion of the additional channel waveguide, the plurality of additional optical elements adapted to interact with light propagating in the additional channel waveguide, wherein a period of the plurality of additional optical elements changes nonlinearly along the portion of the additional channel waveguide.

In various embodiments, an overclad may be formed or arranged over the channel waveguide and the plurality of optical elements. The overclad may also be formed or arranged over the additional channel waveguide and the plurality of additional optical elements.

In various embodiments of forming the channel waveguide, at 122, a grating coupler or an inverse tapering region may be formed at an end region of the channel waveguide. Further, in various embodiments, a grating coupler or an inverse tapering region may be formed at an end region of the additional channel waveguide.

In various embodiments, the method may further include providing a carrier, wherein the channel waveguide may be formed on the carrier. The additional channel waveguide may also be formed on the carrier. The carrier may include at least one of a dielectric substrate or a semiconductor substrate. In various embodiments, the carrier may include a silicon-on-insulator (SOI) substrate, a silicon (Si) substrate, a silicon dioxide (SiOx) substrate, or an aluminum gallium arsenide (AlGaAs) substrate.

In various embodiments, the channel waveguide and/or the additional channel waveguide may have a height, h, in a range of between about 150 nm and about 350 nm, for example, between about 150 nm and about 250 nm, between about 250 nm and about 350 nm, or between about 200 nm and about 300 nm, e.g., about 200 nm, about 250 nm, or about 300 nm. It should be appreciated that the dimension of the height of the channel waveguide and/or the additional channel waveguide may be varied based on the waveguide design and/or platform. As a non-limiting example, based on a silicon-on-insulator (SOI) substrate or platform, the height of the channel waveguide may be about 250 nm.

In various embodiments, the channel waveguide and/or the additional channel waveguide may have a width, W, in a range of between about 200 nm and about 500 nm, for example, between about 200 nm and about 400 nm, between about 200 nm and about 300 nm, between about 300 nm and about 500 nm, between about 200 nm and about 250 nm, between about 250 nm and about 300 nm, or between about 230 nm and about 280 nm, e.g., about 200 nm, about 250 nm, or about 300 nm. It should be appreciated that the dimension of the width of the channel waveguide and/or the additional channel waveguide may be varied based on the waveguide design and/or platform. As a non-limiting example, based on a silicon-on-insulator (SOI) substrate or platform, the width of the channel waveguide may be about 500 nm. Nevertheless, it should be appreciated that a width, W, of more than 500 nm may also be provided.

In various embodiments, the portion of the channel waveguide and/or the portion of the additional channel waveguide may have a length, L, of about 500 μm or more (e.g. ≥500 μm), for example ≥600 μm, ≥700 μm, ≥800 μm or ≥1000 μm. It should be appreciated that, depending on the choice of material platform and amount of dispersion needed to be generated, the length, L, may be a few hundred microns long, or a few millimeters long or even longer.

In the context of various embodiments, the channel waveguide and/or the additional channel waveguide may include at least one of a dielectric material or a semiconductor material. In various embodiments, the channel waveguide may include silicon (Si), silicon nitride ($SiN_x$) or gallium arsenide (GaAs).

While the method described above is illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

FIG. 1E shows schematic top and cross sectional views of an optical device 100e, according to various embodiments. The optical device 100e may include a channel waveguide 102, and a nonlinearly chirped grating 104e defined in (or along) at least a portion of the channel waveguide 102. The nonlinearly chirped grating 104e may interact with light 106 propagating in the channel waveguide 102. For example, the nonlinearly chirped grating 104e may reflect light 106 propagating in the channel waveguide 102.

The optical device 100e may further include an additional channel waveguide arranged adjacent to the channel waveguide 102 for coupling light (e.g., counterpropagating light) between the channel waveguide 102 and the additional channel waveguide, and an additional nonlinearly chirped grating defined in at least a portion of the additional channel waveguide. Accordingly, an optical device having coupled channel waveguides or coupled nonlinearly chirped gratings may be provided.

Various embodiments may further provide an optical device. The optical device may include a channel waveguide, and a plurality of optical elements arranged along at least a portion of the channel waveguide to interact with light propagating in the channel waveguide, wherein the plurality of optical elements are arranged to be non-linearly chirped along the portion of the channel waveguide.

Various embodiments may further provide an optical device. The optical device may include a channel waveguide having opposite corrugated sidewalls along at least a portion of the channel waveguide, wherein a period, Λ, of the corrugations of the corrugated sidewalls changes nonlinearly along the portion of the channel waveguide. This may mean that corrugations are defined or formed on opposite sidewalls of the channel waveguide. The opposite corrugated sidewalls may interact with light propagating in the channel waveguide. For example, the opposite corrugated sidewalls may reflect light propagating in the channel waveguide. The optical device may further include an additional channel waveguide arranged adjacent to the channel waveguide for coupling light (e.g., counterpropagating light) between the channel waveguide and the additional channel waveguide, wherein the additional channel waveguide may include opposite corrugated sidewalls along at least a portion of the additional channel waveguide, and wherein a period, Λ, of the corrugations of the corrugated sidewalls of the additional channel waveguide may change nonlinearly along the portion of the additional channel waveguide. The optical device may be as described in the context of the optical device 100a (FIG. 1A). It should be appreciated that one or more features or components of the optical device 100a may be additionally provided for the optical device described here.

In various embodiments, the period, Λ, of the corrugations defined on one side of the channel waveguide may change in sync with the period, Λ, of the corrugations defined on an opposite side of the channel waveguide. The period, Λ, of the corrugations defined on one side of the additional channel waveguide may change in sync with the period, Λ, of the corrugations defined on an opposite side of the additional channel waveguide.

In various embodiments, the period, Λ, of the corrugations of one corrugated sidewall of the channel waveguide may be at least substantially similar or identical to the period, Λ, of the corrugations formed on the opposite corrugated sidewall of the channel waveguide. In various embodiments, the period, Λ, of the corrugations of one corrugated sidewall of the additional channel waveguide may be at least substantially similar or identical to the period, Λ, of the corrugations formed on the opposite corrugated sidewall of the additional channel waveguide.

In various embodiments, the corrugated sidewalls of the channel waveguide and/or the additional channel waveguide may have a sinusoidal profile.

In various embodiments, a depth, ΔW, of the corrugations of the channel waveguide and/or the additional channel waveguide may change along the portion of the channel waveguide and/or the additional channel waveguide.

It should be appreciated that embodiments described in the context of one of the devices are analogously valid for the other devices. Similarly, embodiments described in the context of a method are analogously valid for a device, and vice versa.

In the context of various embodiments, the optical device 100a, 100b, 100c, 100e may be a dispersive optical device.

In the context of various embodiments, the optical device 100a, 100b, 100c, 100e may be a silicon (Si) optical device.

FIG. 2A shows a schematic perspective view of an optical device 200, according to various embodiments, illustrating a device configured to generate or capable of generating second and third order group velocity dispersion. The optical device 200 may be a silicon-on-insulator (501) device. FIG. 2A also includes an inset showing a scanning electron micrograph 230 of a section of a device (e.g., 200).

The optical device 200 may include or consists of a silicon (Si) waveguide 202, which for example, may be a silicon (Si) channel waveguide. The Si waveguide 202 may be formed on a carrier 201, such as an SOI substrate. The Si waveguide 202 may be about 500 nm in width (e.g., W=500 nm) and about 250 nm in height (e.g., h=250 nm) with sinusoidally modulated sidewalls 210a, 210b, with a modulation amplitude or depth of about 50 nm (e.g., ΔW=50 nm). As shown in FIG. 2A, the sinusoidally modulated sidewalls 210a, 210b of the Si waveguide 202 include corrugations 204. The corrugations 204 may act as or similar to a grating. The sinusoidally modulated sidewalls 210a, 210b or corrugated sidewalls 210a, 210b may be formed along a portion 203 of the Si waveguide 202. It should be appreciated that alternate grating configurations may also be adopted to engineer similar types of dispersion, for example a grating defined by cylindrical elements arranged spaced apart from opposite sidewalls of the Si waveguide (e.g., see FIG. 1B) or a plurality of openings defined at least partially through the Si waveguide (e.g., see FIG. 1C). The sinusoidal sidewall configuration as show in FIG. 2A may be employed for its ease of fabrication with single-step lithography.

The Si waveguide 202 may be formed with a bend 212, for example angled at about 90°. This may mean that sections of the Si waveguide 202 before and after the bend 212 may be arranged at least substantially orthogonal to each other. The bend 212 may have a radius of about 50 μm. The Si waveguide 202 may include a first end 208a, which may act as Port 1, e.g., as an optical input/output (I/O) port, and a second end 208b, which may act as Port 2, e.g., as an optical input/output (I/O) port. For example, an optical signal (e.g., light) may be launched into and/or received from the Si waveguide 202 via Port 1 208a and/or Port 2 208b. Light launched into Port 1 208a may be output at Port 1 208a, generating positive TOD. Light launched into Port 2 208b may be output at Port 2 208b, generating negative TOD. This may mean that the light launched into a port may correspondingly be output from the same port, meaning that the input and output ports are the same for the light.

In the embodiment where two coupled waveguide gratings with nonlinear chirps are used (please refer to FIG. 2B to be described later below), optical signals (e.g., light) launched into Port 1a 209a may have the output at Port 2a 208a, being a separate port, and generating positive TOD. Optical signals (e.g., light) launched into Port 1b 209b may have the output at Port 2b 208b, being a separate port and generating negative TOD. This may mean that the output port, where the output of the coupled grating structures may be provided through, may be separate from the input port.

The grating or grating device (generally indicated as 205), defined by the corrugations 204, may be apodized along its length, L, to eliminate or minimise group delay ripple as well as ripple within the pass band. In various embodiments, the local period, Λ(z), of the grating device at any location, z, may be given by $$\Lambda(z) = \Lambda_{ave} + \Delta\Lambda * z^2 \quad \text{(Equation 4)},$$

or, if only second order dispersion is desired, $$\Lambda(z) = \Lambda_{ave} + \Delta\Lambda * (z/L) \quad \text{(Equation 5)},$$

where $\Lambda_{ave}$=295 nm to ensure an operating wavelength close to about 1550 nm and ΔΛ describes the total variation in the grating period within the grating device 205. The value of $\Lambda_{ave}$ may be different depending on the choice of material platform and/or the operating wavelength.

Therefore, the chirp at any point in the grating 205 may vary quadratically with z. It should be noted that z is a dimensionless parameter describing the distance between the start of the grating 205 and the location within the grating 205. Therefore, for example, the location, z, may be relative to an origin of the grating device 205. Qualitatively, each wavelength of light may travel a differential distance into the waveguide grating 205. This effect arises because of the continuously changing period, Λ, along the grating length, L. Each wavelength component may travel into the waveguide grating 205 and be reflected at the point where the local grating period, Λ(z), may be at least substantially Bragg matched with the wavelength of light.

Figure 2B:
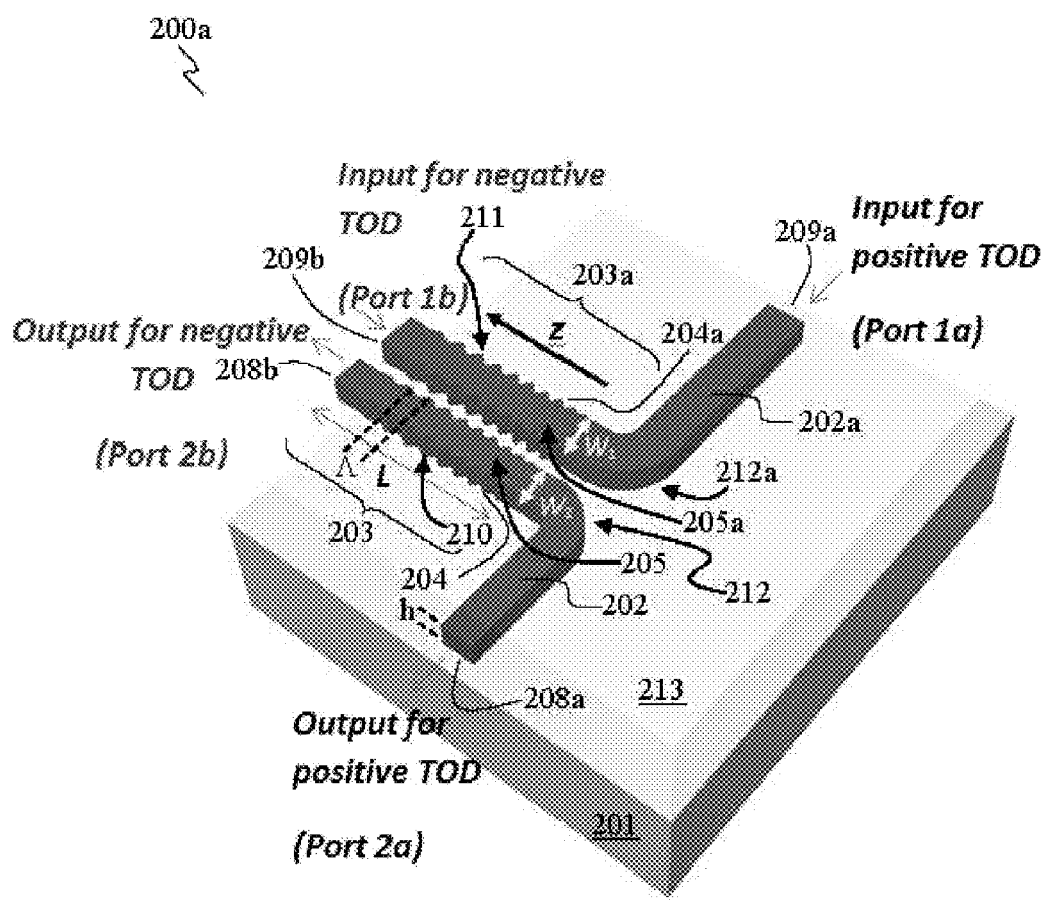
FIG. 2B shows a schematic perspective view of an optical device, according to various embodiments.

FIG. 2B shows a schematic perspective view of an optical device 200a, according to various embodiments, illustrating a coupled grating device for simultaneous generation of second and third order dispersion. Examples of the inputs and outputs for positive and negative third order dispersion are illustrated in FIG. 2B. The optical device 200a may be an improvement over the optical device 200 having or consisting of a single chirped grating 203. The coupled geometry shown in FIG. 2B may allow the output of the dispersion compensated light to be decoupled from the input port. Consequently, the dispersion compensated light may exit at a separate port and may be easily extracted.

The optical device 200a may include a channel waveguide (e.g., a silicon (Si) waveguide) 202 having a bend 212 and sinusoidally modulated sidewalls 210 having corrugations 204, formed on a carrier 201 (e.g., an SOI substrate), which may be as described in the context of the optical device 200 (FIG. 2A). In some embodiments, it should be appreciated that the channel waveguide 202 may not have the bend 212. The corrugations 204 may act as or similar to a grating or grating device (generally indicated as 205). The sinusoidally modulated sidewalls 210 or corrugated sidewalls 210 may be formed along a portion 203 of the Si waveguide 202. The Si waveguide 202 may have a height, h, a width, $W_2$, and a grating length, L. The period, $\Lambda$, of the corrugations 204 may change nonlinearly along the grating length, L. The Si waveguide 202 may include a first end 208a, which may act as Port 2a of the optical device 200a, e.g., as an optical input/output (I/O) port, and a second end 208b, which may act as Port 2b of the optical device 200a, e.g., as an optical input/output (I/O) port. For example, an optical signal (e.g., light) may be launched into and/or received from the Si waveguide 202 via Port 2a 208a and/or Port 2b 208b.

The optical device 200a may further include an additional channel waveguide (e.g., a silicon (Si) waveguide) 202a arranged adjacent or side-by-side with the channel waveguide 202, on the carrier 201. The channel waveguides 202, 202a may be arranged spaced apart from each other but in (close) proximity to each other, for example, in a width direction of the channel waveguide 202 and/or a width direction of the channel waveguide 202a. The channel waveguide 202a may or may not have a bend 212a. The channel waveguide 202a may have sinusoidally modulated sidewalls 211 having corrugations 204a. The corrugations 204a may act as or similar to a grating or grating device (generally indicated as 205a). The sinusoidally modulated sidewalls 211 or corrugated sidewalls 211 may be formed along a portion 203a of the Si waveguide 202a. Therefore, the optical device 200a may include or consist of two coupled gratings 205, 205a with sinusoidally corrugated sidewalls 210, 211.

The Si waveguide 202a may have a height, h, that may be the same as the height of the Si waveguide 202. The Si waveguide 202a may have a width, $W_1$, that may be different from the width, $W_2$, of the Si waveguide 202. The Si waveguide 202a may have a grating length, L, that may be the same as the grating length of the Si waveguide 202. The depth (or modulation amplitude), $\Delta W$, of the corrugations 204a of the Si waveguide 202a may be different from the depth (or modulation amplitude) of the corrugations 204 of the Si waveguide 202.

The portion 203 of the Si channel waveguide 202 and the portion 203a of the Si channel waveguide 202a may overlap with each other, for example, in a width direction of the channel waveguides 202, 202a. For example, this may mean that the portion 203 of the Si channel waveguide 202 and the portion 203a of the Si channel waveguide 202a may be arranged coaxially in a width direction of the Si channel waveguide 202 and/or a width direction of Si channel waveguide 202a.

The Si waveguide 202a may include a first end 209a, which may act as Port 1a of the optical device 200a, e.g., as an optical input/output (I/O) port, and a second end 209b, which may act as Port 1b of the optical device 200a, e.g., as an optical input/output (I/O) port. For example, an optical signal (e.g., light) may be launched into and/or received from the Si waveguide 202a via Port 1a 209a and/or Port 1b 209b.

In various embodiments, light launched into Port 1a 209a may be output at Port 2a 208a, generating positive TOD, while light launched into Port 1b 209b may be output at Port 2b 208b, generating negative TOD. It should be appreciated that the reverse direction of light launch and light output may also be true.

In various embodiments, the optical device 200a may further include an overclad 213 over the channel waveguides 202, 202a.

The period of the coupled grating 205, 205a may follow the following functional form $$\Lambda(z)=\Lambda_{ave}+\Delta\Lambda^*(z/L)^2 \qquad \text{(Equation 6)},$$

or, if only second order dispersion is desired, $$\Lambda(z)=\Lambda_{ave}+\Delta\Lambda^*(z/L) \qquad \text{(Equation 7)}.$$

The value of $\Lambda_{ave}$ may be dependent on the operating wavelength, $\lambda$, and the effective indices of the left and right waveguides 202, 202a, $n_{eff1,2}$, and governed by the following equation:

$$\lambda=(n_{eff1}+n_{eff2})\cdot\Lambda_{ave} \qquad \text{(Equation 8)}.$$

In various embodiments, in order to ensure that the operating wavelength, of the optical device 200a may be at least substantially centered at about 1.55 µm, the values for various parameters may be set as: width, $W_1$, of the channel waveguide 202a of about 500 nm ($W_1$=500 nm), width, $W_2$, of the channel waveguide 202 of about 400 nm ($W_2$=400 nm), depth, $\Delta W_1$, of the corrugations 204a of about 50 nm ($\Delta W_1$=50 nm), depth, $\Delta W_2$, of the corrugations 204 of about 30 nm ($\Delta W_2$=30 nm), and $\Lambda_{ave}$=305 nm for a silicon on insulator (SOI) platform with a 250 nm silicon thickness.

2D finite difference simulations may be performed to study the ability of the device of various embodiments, such as the optical device 200, to generate dispersion and dispersion slope of a specific sign and magnitude on an incident E-field (electric field) which is TE (transverse electric)-polarized. Each grating device 205 may have a fixed length, L=500 µm, and varying values of $\Delta\Lambda$=2 nm, 4 nm, 7 nm and 10 nm. Apodization in the form of a Blackman function governed by the expression $$f(z)=[1+0.7\cos(2\pi\cdot2/L)-0.3\cos(4\pi\cdot z/L)]/1.4 \qquad \text{(Equation 9)},$$

may be applied to the grating sidewall modulation amplitude along the grating length, L, to eliminate or minimise group delay ripple and ripple within the transmission band. Nevertheless, it should be appreciated that other apodization functions such as raised cosine, cosine, tan h may also be used.

Figure 3A:
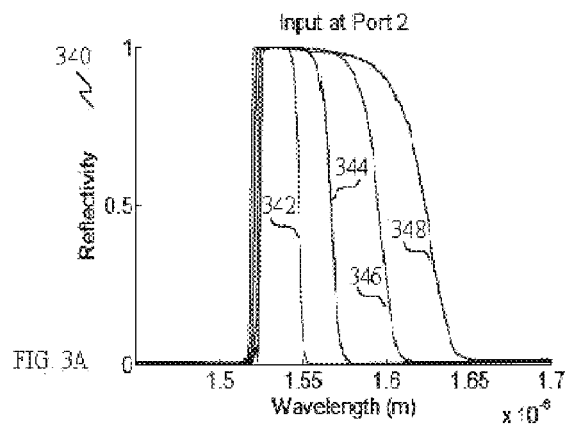
FIG. 3A shows a plot of 2D (two-dimensional) FDTD (finite-difference time-domain) modeling for the grating reflectivity with inputs at Port 2 of an optical device, according to various embodiments.
Figure 3B:
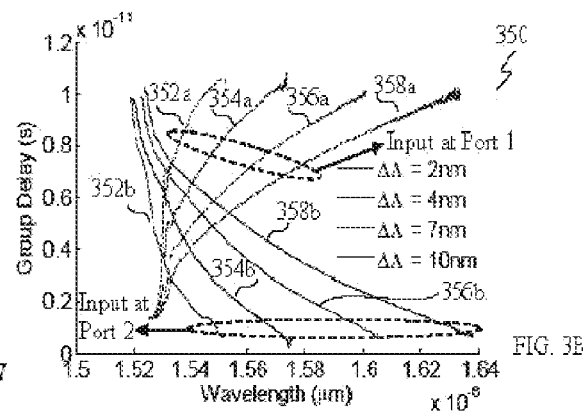
FIG. 3B shows a plot of simulated group delay for different values of ΔΛ with the inputs at Port 1 (dashed lines) and Port 2 (solid lines) of an optical device, according to various embodiments.

FIG. 3A shows a plot 340 of 2D (two-dimensional) FDTD (finite-difference time-domain) modeling for the grating reflectivity with inputs at Port 2 of an optical device (e.g., see FIG. 2A), while FIG. 3B shows a plot 350 of simulated group delay for different values of $\Delta\Lambda$ with the inputs at Port 1 (dashed lines) and Port 2 (solid lines) of an optical device (e.g., see FIG. 2A). FIG. 3A shows spectrum 342 for $\Delta\Lambda$=2 nm, spectrum 344 for $\Delta\Lambda$=4 nm, spectrum 346 for $\Delta\Lambda$=7 nm, and spectrum 348 for $\Delta\Lambda$=10 nm. FIG. 3B shows results 352a, 352b for $\Delta\Lambda$=2 nm, results 354a, 354b for $\Delta\Lambda$=4 nm, results 356a, 356b for $\Delta\Lambda$=7 nm, and results 358a, 358b for $\Delta\Lambda$=10 nm. It may be observed from FIG. 3A that the reflectivity plots or spectra for the devices have no ripple, implying the effectiveness of the apodization function in eliminating ripple in both the reflectivity and the group delay responses, as may also be observed in FIG. 3B.

The group delay, τ, for each device may be calculated using the spectral phase, $\phi(\omega)$ obtained from FDTD simulations using the expression $$\tau(\omega) = \frac{\partial \varphi(\omega)}{\partial \omega}, \quad \text{(Equation 10)}$$

where ω is the angular frequency.

Figure 3C:
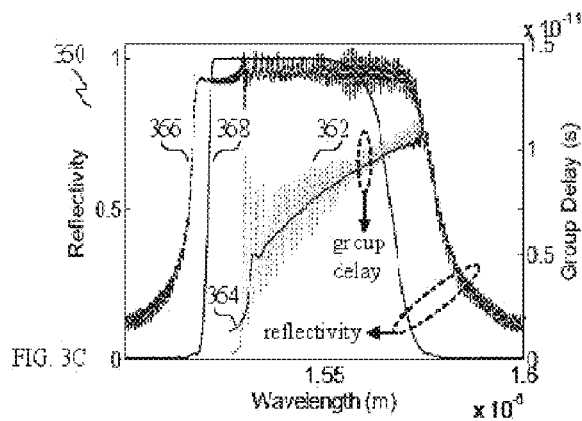
FIG. 3C shows a plot of group delay and reflectivity for ΔΛ=4 nm, launched from Port 1 of an optical device with and without grating apodization, according to various embodiments.

To further illustrate the effectiveness of the apodization function in reflectivity and group delay ripple suppression, FIG. 3C shows a plot 360 of group delay, with spectrum 362 for an optical device without grating apodization and spectrum 364 for an optical device with grating apodization, and reflectivity, with spectrum 366 for an optical device without grating apodization and spectrum 368 for an optical device with grating apodization, for ΔΛ=4 nm, launched from Port 1 of the optical device (e.g., see FIG. 2A). It may be observed that significant ripple exists in both the reflectivity (spectrum 366) and the group delay spectra (spectrum 362). It is therefore evident that the apodization function may be required for obtaining a good spectral response.

In order to extract the values of D (group velocity dispersion (GVD) parameter) and S (third order dispersion parameter), the group delay generated by each device, τ(λ), may be fitted with a quadratic function as provided below, $$\tau(\lambda) = \frac{S}{2}(\lambda - \lambda_0)^2 + D(\lambda - \lambda_0) + \tau_0, \quad \text{(Equation 11)}$$

where $\tau_0$ is a constant group offset, and $\lambda_0$ is the blue edge of the group delay.

Figure 3D:
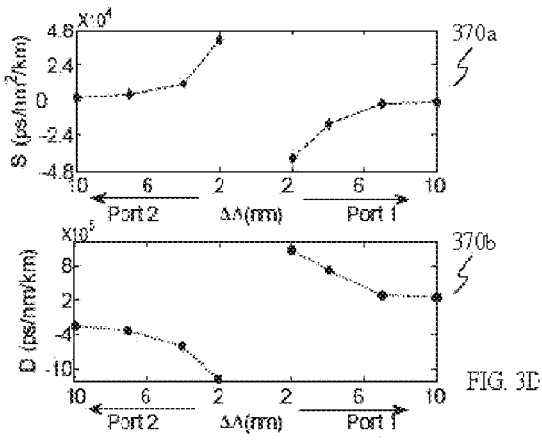
FIG. 3D shows respective plots of extracted values of D (group velocity dispersion (GVD) parameter) and S (third order dispersion parameter) plotted as a function of ΔΛ for inputs at Ports 1 and 2 of an optical device, according to various embodiments.

The extracted values of S and D (scaled with the grating length, L) as ΔΛ is varied are plotted in FIG. 3D. FIG. 3D shows respective plots 370a, 370b of extracted values of D (group velocity dispersion (GVD) parameter) and S (third order dispersion parameter) plotted as a function of ΔΛ for inputs at Ports 1 and 2 of an optical device (e.g., see FIG. 2A). It may be observed from FIGS. 3B and 3D that the generated TOD (third order dispersion) may be tailored in both sign and magnitude. Light launched into input or Port 1 (e.g., see FIG. 2A) may undergo anomalous dispersion and negative TOD, whereas light launched into input or Port 2 may experience normal dispersion and positive TOD. A smaller magnitude of both D and S may be generated for larger values of ΔΛ. It should be noted that the form of chirp introduced in these devices generate D and S which are opposite in sign, and thus may be suitable or ideal for simultaneous compensation in silicon waveguides possessing D and S which are also opposite in sign.

Measurement or experimental characterization of the optical devices of various embodiments will now be described by way of the following non-limiting examples.

In order to characterize the designed devices, several gratings with varying values of ΔΛ are fabricated. The devices are first patterned using electron-beam lithography. Reactive ion etching is used to define the grating structures, followed by an overcoating of PMMA (poly(methyl methacrylate)) as the overcladding. PMMA is chosen as the overcladding as its refractive index of about 1.49 is quite closely matched to that of silicon dioxide. A scanning electron micrograph of an optical device of various embodiments may be as shown in the inset of FIG. 2A. Inverse tapers may be used to terminate the waveguides (e.g., 202, FIG. 2A) at both ends (e.g., 208a. 208b, FIG. 2) of the gratings (e.g., 205, FIG. 2A) in order to enhance fiber—waveguide coupling efficiency. An amplified spontaneous emission source may be first launched into an in-line fiber polarizer to select TE light. The light may then be launched into the waveguide (e.g., 202, FIG. 2A) using, for example, a tapered fiber. For reflection measurements, a circulator may be used to reroute the reflected data for measurement. Spectral measurements may then be performed using an optical spectrum analyzer.

As non-limiting examples, gratings with ΔΛ=2 nm-10 nm were fabricated and their respective reflection spectrum was characterized. Each device may be composed of an input waveguide of about 200 μm in length, followed by a grating of length, L, of about 500 μm, followed by an output waveguide of about 200 μm in length.

Figure 4:
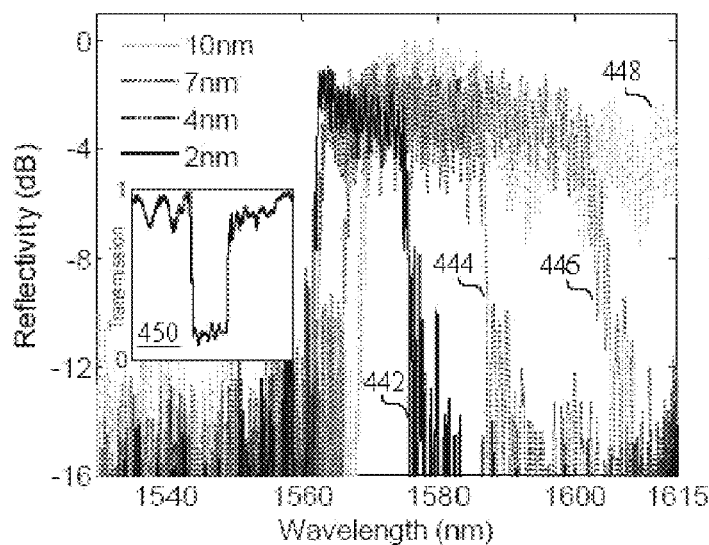
FIG. 4 shows a plot of reflection spectra of grating devices having different ΔΛ values, with light launched into Port 2 of an optical device, according to various embodiments.

FIG. 4 shows a plot 440 of reflection spectra of grating devices having different ΔΛ values, with light launched into Port 2 of an optical device, according to various embodiments. In plot 440, reflection spectrum 442 corresponds to ΔΛ=2 nm, reflection spectrum 444 corresponds to ΔΛ=4 nm, reflection spectrum 446 corresponds to ΔΛ=7 nm, and reflection spectrum 448 corresponds to ΔΛ=10 nm. FIG. 4 also includes an inset 450 illustrating the transmission spectrum for ΔΛ=2 nm in linear units showing approximately 90% extinction.

As may be seen in FIG. 4, an overall increase in the bandwidth of the gratings may be observed as ΔΛ is increased. Further, it may be observed that the longer wavelengths have a lower reflectivity overall. This effect may be likely attributed to the fact that the grating period changes much more rapidly further along the z-axis by virtue of the quadratic relationship between the grating pitch and z. In gratings where the chirp is large, e.g., the period of the gratings is distributed over a much larger range, the total bandwidth may be increased, but at the expense of a lower absolute reflectivity. Since the grating pitch corresponding to the longer Bragg wavelengths may change much more rapidly as z increases, the effective coupling strength at longer wavelengths may be reduced. A secondary contribution to the lower reflectivities at longer wavelengths may be due to the inverse relation between coupling coefficient and wavelength.

The group delay characteristics of the different devices may be extracted using the Fabry-Perot oscillations generated from the reflected data. As shown in the inset 450 of FIG. 4, the transmission of light through the gratings is approximately 10%, implying that close to approximately 90% of incident light within the bandgap may be reflected. Therefore, the Fabry-Perot oscillations may be dominated by mirrors which may be formed from the air-waveguide boundary at the input waveguide and the point of reflection in the grating. The generated Fabry-Perot oscillations may possess a free spectral range (FSR), Δλ(λ), which may vary as a function of wavelength, λ, according to the expression $$\Delta\lambda(\lambda) = \frac{\lambda^2}{2.n_g(\lambda).L(\lambda)}, \quad \text{(Equation 12)}$$

where $n_g$ refers to group index.

The differential lengths over which light of different wavelengths propagate provide the group delay, Δτ(λ), which may be expressed as $$\Delta\tau(\lambda) = 2n_g(\lambda)L(\lambda) \quad \text{(Equation 13)},$$

Figure 5A:
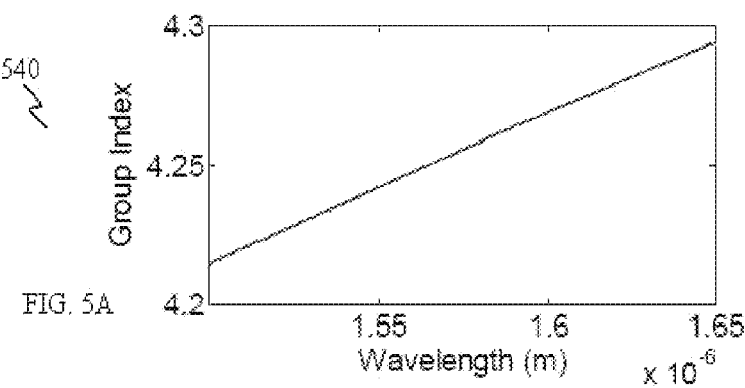
FIG. 5A shows a plot of calculated group index as a function of wavelength.

FIG. 5A shows a plot 540 of calculated group index, $n_g$, as a function of wavelength used to extract the group delay, Δτ(λ). The group index, $n_g$, to extract Δλ and Δτ(λ) may be calculated using the effective indices found from a fully vectorial beam propagation method. Sellmeier coefficients for silicon and silicon dioxide may be used in order for both material and waveguide dispersion to be accounted for.

Figure 5B:
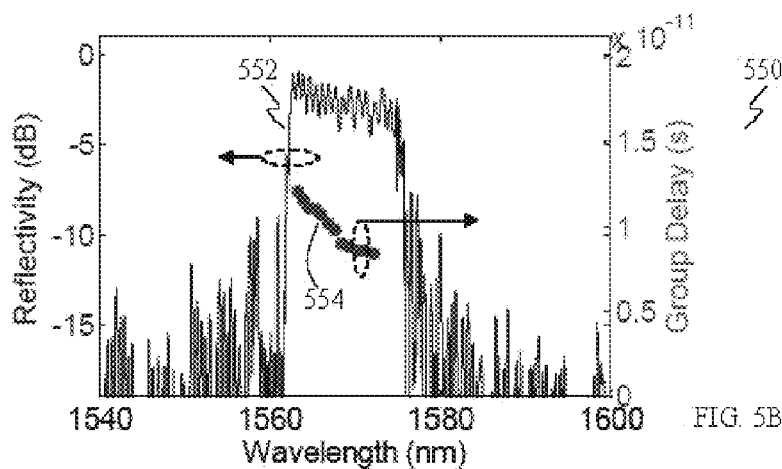
FIG. 5B shows a plot of group delay and reflectivity for an optical device with ΔΛ=2 nm with light launched from Port 2.
Figure 5C:
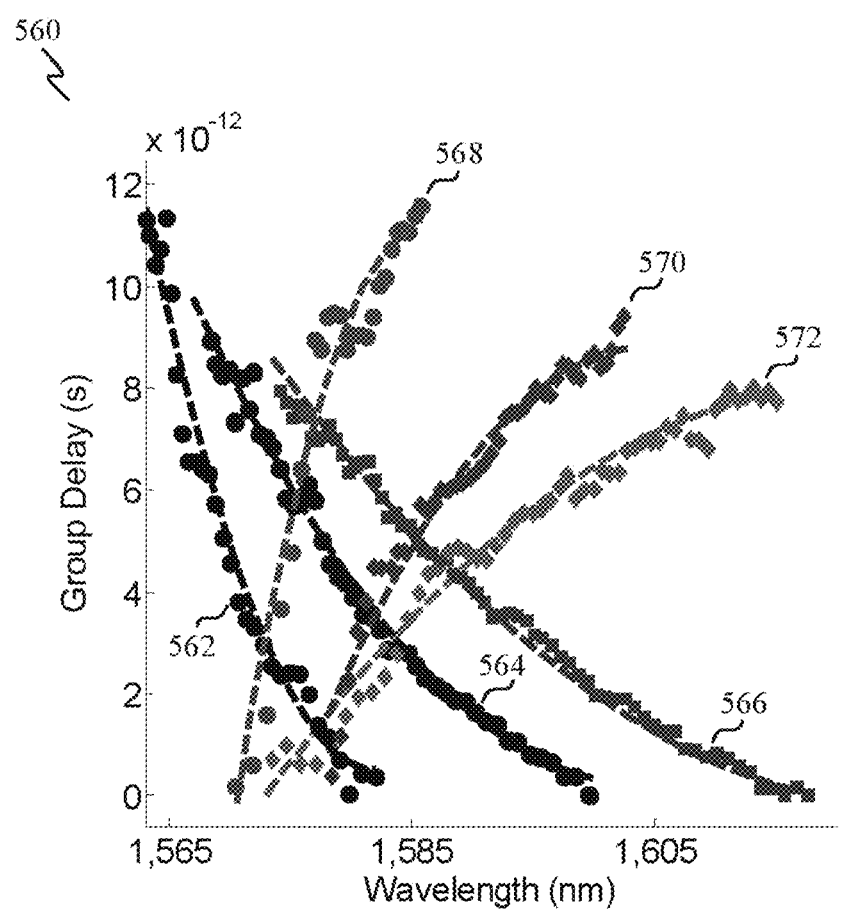
FIG. 5C shows a plot of group delay as a function of wavelength for light launched into Ports 1 and 2 of an optical device, for different values of ΔΛ, according to various embodiments.

The measured group delay for optical devices of various embodiments are as shown in FIGS. 5B and 5C. FIG. 5B shows a plot 550 of group delay and reflectivity for an optical device with ΔΛ=2 nm with light launched from Port 2 (e.g., see FIG. 2A). Plot 550 shows a reflection spectrum 552 and results 554 for the group delay.

FIG. 5C shows a plot 560 of group delay as a function of wavelength for light launched into Ports 1 and 2 of an optical device (e.g., see FIG. 2A), for different values of ΔΛ. Plot 560 shows group delay results 562, 564, 566 for ΔΛ=4 nm, 7 nm, 10 nm respectively for light launched from Port 1, and group delay results 568, 570, 572 for ΔΛ=4 nm, 7 nm, 10 nm respectively for light launched from Port 2.

Devices with ΔΛ=2 nm may lead to a group delay which may be relatively flat with respect to the wavelength and may deviate quite significantly from the expected profile (see FIG. 5B). This likely implies that the electron-beam process used to write the patterns may be unable to resolve the continuous period changes in the small range from about 295 nm-297 nm along the length of the device. Devices with ΔΛ=4 nm, 7 nm and 10 nm have group delay profiles (see FIG. 5C) which may agree well with the spectral characteristics in simulations (see FIG. 3B).

Figure 6A:
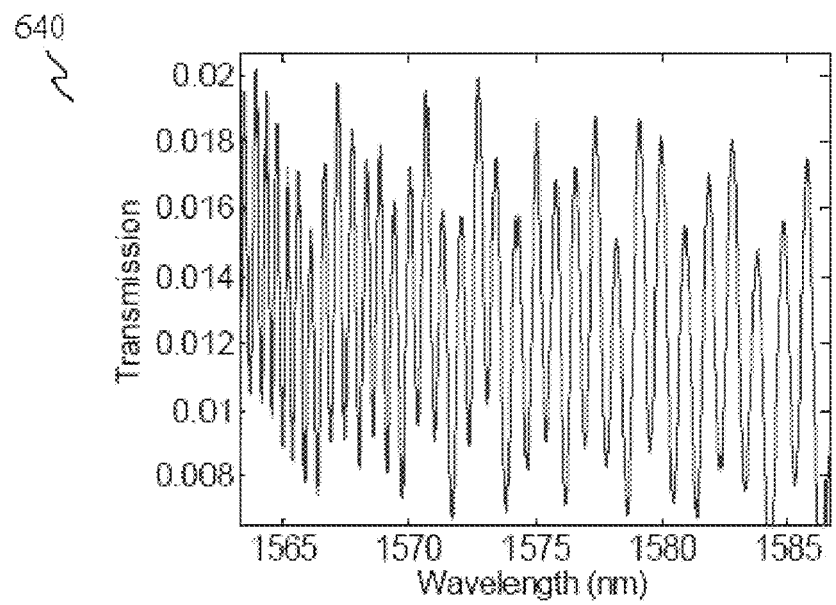
FIG. 6A shows a plot of Fabry Perot oscillations arising from a device with a grating length, L, of about 500 μm, with light launched into Port 2 of an optical device.

In addition, Fabry-Perot oscillations from a device generating normal dispersion and positive TOD may be as shown in FIG. 6A, illustrating the Fabry Perot oscillations arising from a device with a grating length, L=500 μm, with light launched into Port 2 (e.g., see FIG. 2A). As may be observed, it is clear that the period of the oscillations decreases quite quickly with wavelength. As a further check of the origin of the Fabry-Perot oscillations in the measured spectra, the cavity length, L(λ) may be calculated. From FIG. 6A, it may be observed that the FSR, Δλ(λ), obtained in the measurements may range from about 0.4 nm-1.05 nm. Using Equation 12, this range of values of L(λ) corresponding to this range of FSRs is between about 200 μm and about 700 μm. This range of values of L(λ) matches very well with the length between the start of the input waveguide and the start of the grating (~200 μm) and that between the start of the input waveguide and the end of the grating (~700 μm). It should be noted that the presence of secondary oscillations arising from the air-waveguide boundary at the output waveguide may be largely precluded by the low transmission of light through the gratings (see inset 450 of FIG. 4). It should also be noted that all waveguide bends (e.g., 212, FIG. 2A) used in the optical devices of various embodiments may have a radius of about 50 μm, and therefore may have minimal effects on the measured dispersion.

Figure 6B:
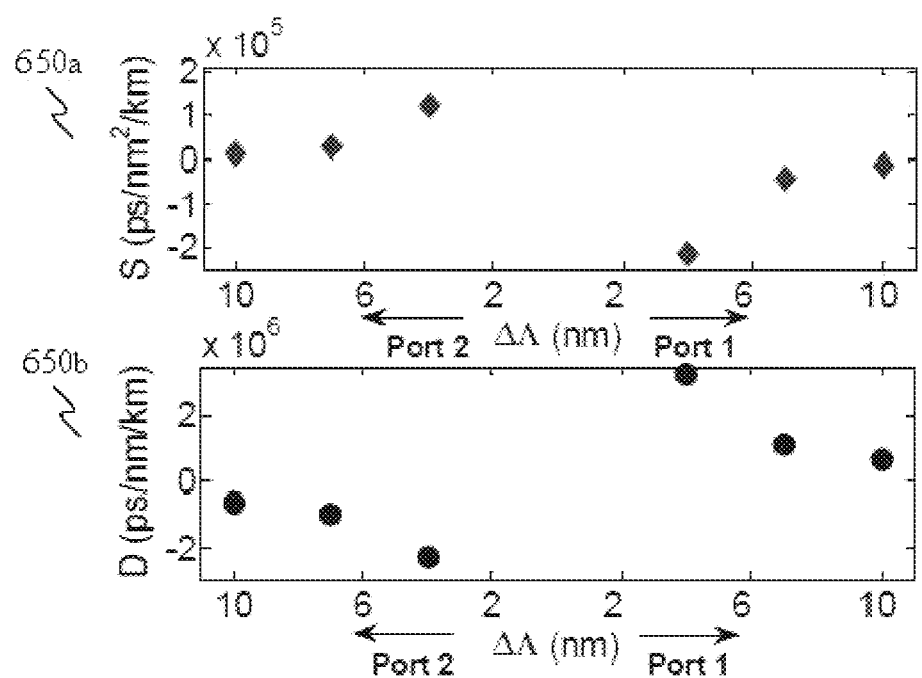
FIG. 6B shows respective plots of measured values of S (third order dispersion parameter) and D (group velocity dispersion (GVD) parameter) for light launched into Ports 1 and 2 of an optical device, according to various embodiments.

The optical devices of various embodiments may generate a second order dispersion and third order dispersion simultaneously. In order to extract the TOD coefficient from each of the devices, fits may be applied according to Equation 11 for each of the curves. The extracted values of D (group velocity dispersion (GVD) parameter) and S (third order dispersion parameter) are plotted in FIG. 6B, which shows the measured values of S (plot 650*a*) and D (plot 650*b*) for light launched into Ports 1 and 2 (e.g., see FIG. 2A).

It may be observed that both positive and negative values of D and S with varying magnitudes may be generated. In addition, it may be observed that the magnitudes of D and S decrease as ΔΛ is increased in magnitude from about −4 nm to about −10 nm, in good agreement with trends observed in the modeling results. The measured values of S for ΔΛ=10 nm when light is launched from Port 2 and Port 1 are about $1.2 \times 10^4$ ps/nm$^2$/km and about $-1.4 \times 10^4$ ps/nm$^2$/km respectively. The dispersion slope generated in each of these devices may be tailored to be either positive or negative depending on the dispersion characteristics of the waveguide in question. Silicon waveguides with dimensions of about 430 nm by about 1.3 μm have normal dispersion with a positive dispersion slope at a wavelength of about 1.55 μm. Therefore, light launched into Port 1 of the device with ΔΛ=2 nm, 4 nm or 10 nm may impart anomalous dispersion and a negative dispersion slope necessary for compensating for both the second and third order dispersion in such a waveguide. Conversely, a silicon waveguide which is about 300 nm by about 300 nm may possess anomalous dispersion and a negative dispersion slope at a wavelength of about 1.5 μm, and in this case, launching light into Port 2 of the device with ΔΛ=4 nm, 7 nm or 10 nm may be suitable or ideal for compensating for both the second and third order dispersion. It should be noted that adjustment of the average pitch of the grating may be easily performed to accommodate operation at wavelengths other than 1.55 μm.

Figure 7A:
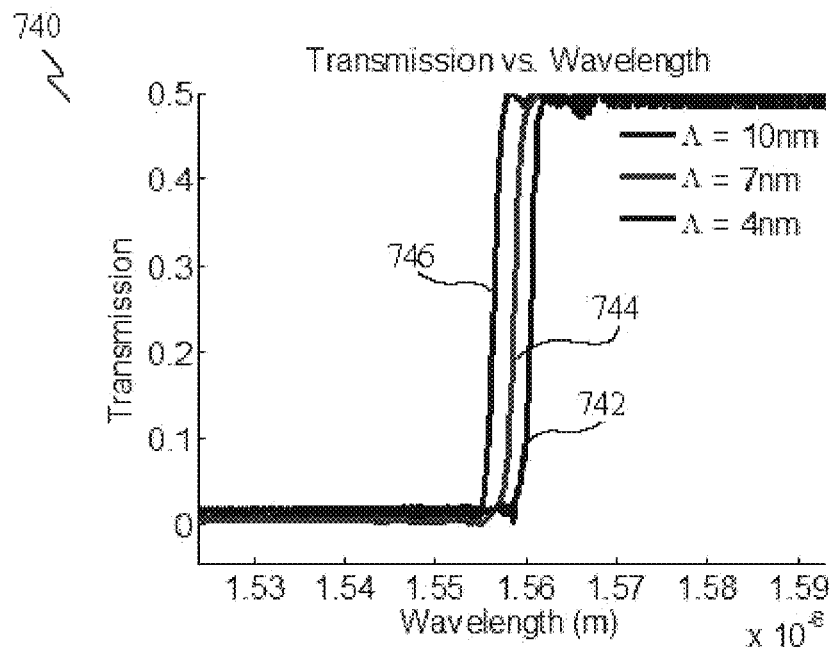
FIGS. 7A and 7B show respective plots of the transmission and group delay characteristics of an optical device having a coupled grating geometry, according to various embodiments.
Figure 7B:
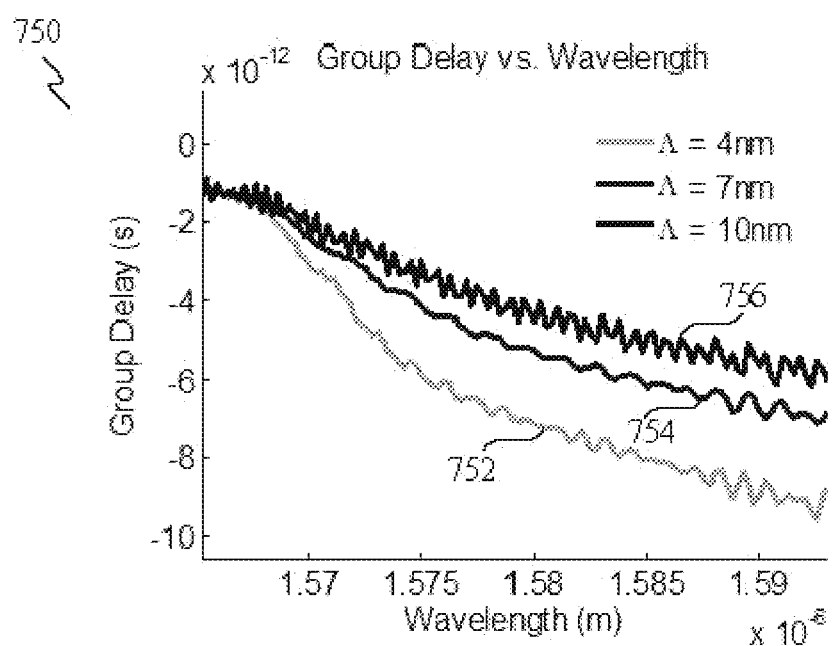

FIGS. 7A and 7B show respective plots 740, 750 of the transmission and group delay characteristics of an optical device having a coupled grating geometry (e.g., 200*a*, FIG. 2B). Plot 740 shows result 742 for Λ=4 nm, result 744 for Λ=7 nm, and result 746 for Λ=10 nm. Plot 750 shows result 752 for Λ=4 nm, result 754 for Λ=7 nm, and result 756 for Λ=10 nm.

In various embodiments, variation of the value of ΔΛ may enable the second and third order dispersion to be varied in sign and magnitude. Both second and third order dispersion may be simultaneously generated by the optical devices of various embodiments. The increase in the device length may enable varying amounts of optical power to be transmitted at the dispersion compensated output.

As described above, the design, fabrication and characterization of a dispersive element capable of generating second and third order dispersion simultaneously has been demonstrated. Tailoring the design parameters may allow the generation of arbitrary signs and magnitudes of group velocity dispersion (GVD) and third order dispersion (TOD)—a feature which may be suitable or ideal when used in the context of silicon-on-insulator (SOI) waveguides or any other material platform where waveguide geometry may strongly influence its dispersion. Second order dispersion as high as about $-2.3 \times 10^6$ ps/nm/km and third order dispersion as high as about $1.2 \times 10^5$ ps/nm$^2$/km and as low as about $1.2 \times 10^4$ ps/nm$^2$/km may be obtained at a wavelength of about 1.55 μm.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical device comprising:
   a plurality of channel waveguides; and
   a plurality of optical elements arranged along at least a portion of each channel waveguide of the plurality of the channel waveguides to interact with light propagating in the channel waveguides, wherein a period of the plurality of optical elements changes nonlinearly along the portion of the channel waveguides;
   wherein the channel waveguides are optically coupled to each other;

wherein each channel waveguide of the plurality of waveguides comprises a plurality of planar surfaces;

wherein the optical elements comprise corrugations on opposite planar surfaces of the channel waveguides;

wherein the corrugations have a sinusoidal profile.

2. The optical device as claimed in claim 1, wherein the period of the plurality of optical elements changes as a quadratic function of a distance along the portion of each channel waveguide of plurality of the channel waveguides relative to an origin of the portion of the channel waveguide.

3. A method for forming an optical device, the method comprising:

forming a plurality of channel waveguides; and forming a plurality of optical elements along at least a portion of each channel waveguide of the plurality of the channel waveguides, the plurality of optical elements adapted to interact with light propagating in the channel waveguides, wherein a period of the plurality of optical elements changes nonlinearly along the portion of the channel waveguides;

wherein the channel waveguides are optically coupled to each other;

wherein each channel waveguide of the plurality of waveguides comprises a plurality of planar surfaces;

wherein the optical elements comprise corrugations on opposite planar surfaces of the channel waveguides;

wherein the corrugations have a sinusoidal profile.

4. The method as claimed in claim 3, wherein the period of the plurality of optical elements changes as a quadratic function of a distance along the portion of each channel waveguide of the plurality of the channel waveguides relative to an origin of the portion of the channel waveguide.

* * * * *

UNITED STATES PATENT AND TRADEMARK OFFICE
CERTIFICATE OF CORRECTION

PATENT NO. : 9,671,673 B2
APPLICATION NO. : 14/542782
DATED : June 6, 2017
INVENTOR(S) : Dawn Tan et al.

It is certified that error appears in the above-identified patent and that said Letters Patent is hereby corrected as shown below:

In the Specification

Column 4, Line 44: Please delete "co and coo" and write "$\omega$ and $\omega_0$" in place thereof.

Column 15, Line 39: Please delete the number "501" and write "SOI" in place thereof.

Column 18, Line 23: Please insert --$\lambda$-- between the words "wavelength" and "of".

Column 18, Line 42: Please delete the expression "2/L" in Equation 9 and write "z/L" in place thereof.

Column 18, Line 47: Please delete "tan h" and write "tanh" in place thereof.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*